United States Patent
Inokuchi (10) Patent No.: US 7,652,091 B2
(45) Date of Patent: Jan. 26, 2010

(54) COATING COMPOSITION FOR RUBBER

(75) Inventor: Yoshinori Inokuchi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 646 days.

(21) Appl. No.: 11/396,463

(22) Filed: Apr. 4, 2006

(65) Prior Publication Data
US 2006/0222870 A1 Oct. 5, 2006

(30) Foreign Application Priority Data
Apr. 5, 2005 (JP) ............................. 2005-108893

(51) Int. Cl.
*C08L 83/08* (2006.01)
(52) U.S. Cl. ............................. 524/474; 528/38; 528/34
(58) Field of Classification Search ................. 525/474; 528/38, 34
See application file for complete search history.

(56) References Cited

U.S. PATENT DOCUMENTS 3,455,725 A * 7/1969 Bailey et al. ................. 427/214
6,750,309 B1 * 6/2004 Chu et al. ..................... 528/28

* cited by examiner

*Primary Examiner*—Kuo-Liang Peng
(74) *Attorney, Agent, or Firm*—Millen, White Zelano & Branigan, P.C.

(57) ABSTRACT

The invention provides a coating composition for rubbers which forms a coating film having excellent adhesion to the rubber surface as well as excellent wear resistance and surface lubricity. The composition is an aqueous resin composition containing 100 parts by weight of the component (A), 10 to 100 parts by weight of the component (B) and 5 to 150 parts by weight of the component (C): wherein the component (A) is a curable silicone composition consisting of (A-1) which is an organopolysiloxane in which a group selected from the group consisting of a hydroxyl group and groups represented by the formula $R^1O-$ ($R^1$ is a monovalent hydrocarbon group), and a group represented by the formula (1), below are bonded to each of at least two terminal silicon atoms of a polysiloxane chain:

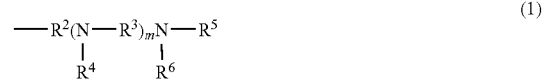

(1)

(A-2) which is an alkoxysilane and, optionally, (A-3) which is a metal compound as a condensation catalyst; component (B) which is a polyurethane resin; and component (C) which is an organic resin fine powder having a melting point of 150° C. or higher and an average particle diameter of 0.5 to 50 μm.

7 Claims, 2 Drawing Sheets

COATING COMPOSITION FOR RUBBER

BACKGROUND OF THE INVENTION

The present invention relates to a coating composition for rubber that imparts a coating having superior adhesion to rubber as well as superior wear resistance and surface lubricity.

A method for imparting lubricity and wear resistance to the surface of various types of rubbers has been used in the prior art in which, after applying a silicone resin composition to the surface of a rubber article, the composition is cured to form a cured coating layer to coat the surface of the rubber with the coating.

Examples of silicone resin compositions that have been proposed for use in this case include a composition comprising an organopolysiloxane containing epoxy groups and an alkoxysilane containing an amino group (see Japanese Patent Application Laid-open No. S54-43891), a composition comprising an organopolysiloxane containing hydroxyl groups, an organohydrogen polysiloxane, an organopolysiloxane containing epoxy groups and an alkoxysilane containing an amino group (see Japanese Patent Application Laid-open Nos. S54-45361, S54-90369 and S54-90375), a composition comprising an organopolysiloxane containing hydroxyl groups, an organohydrogen polysiloxane and the hydrolysis condensation product of a dialkoxysilane containing an amino group (see Japanese Patent Application Laid-open Nos. H7-109441 and H7-126417), a composition comprising an organopolysiloxane containing hydroxyl groups or vinyl groups, an organohydrogen polysiloxane and a dimethyl polysiloxane (see Japanese Patent Application Laid-open No. S62-215667), a composition comprising an organopolysiloxane containing a hydrolyzable group, an organopolysiloxane containing epoxy groups or amino groups and a hydrolyzable group and a hydrolyzable silane containing an epoxy group or an amino group (see Japanese Patent Application Laid-open No. H7-196984), a composition composed of a reaction product of a silane or siloxane containing an amino group and a silane or siloxane containing an epoxy group, a polydiorganosiloxane containing hydroxyl groups and a polyorganohydrogen siloxane (see Japanese Patent Application Laid-open No. S56-78960), a composition comprising a reaction product of a silane or siloxane containing an amino group and an alkoxy group and a silane or siloxane containing an epoxy group and an alkoxy group, and a polyorganosiloxane containing an alkoxy group or hydroxyl group and an amino group (see Japanese Patent Application Laid-open No. H11-43647), a composition comprising a polyorganosiloxane containing hydroxyl groups and epoxy groups, an alkoxysilane containing an amino group and an alkoxysilane containing a mercapto group (see Japanese Patent Application Laid-open No. H5-5082), a composition comprising a polydiorganopolysiloxane containing hydroxyl groups, a polyorganohydrogen siloxane, a organosiloxane containing a water-soluble amino group, an aminosilane compound, an epoxysilane compound, a carboxylic acid and an alkyl amine oxide (see Japanese Patent Application Laid-open No. 2002-188057), a composition composed of a hydrolysis condensation product of an acryl-silicone graft copolymer and an amino group-containing dialkoxysilane, and an organopolysiloxane containing epoxy groups (see Japanese Patent Application Laid-open No. H7-109440), and a composition composed of a diorganosiloxane containing hydroxyl groups, an epoxy resin and a silane containing a an amino group (see Japanese Patent Application Laid-open No. H4-318021).

However, since coatings obtained from these silicone resin compositions lack wear resistance and surface lubricity, silicone resin compositions blended with fine powder have been proposed to improve these properties.

Silicone resin compositions have been proposed which are blended with a fine powder such as polymethyl silsesquioxane, specific examples of which include a composition comprising a polyorganosiloxane containing hydroxyl groups, a polyorganosiloxane containing epoxy groups, an alkoxysilane containing an amino group and a polymethyl silsesquioxane powder (see Japanese Patent Application Laid-open No. S61-159427 and H2-233763), and a composition comprising a dimethyl polysiloxane containing a silanol group, a diorganopolysiloxane containing amino groups, a γ-glycidoxypropyl trimethoxysilane, and a polymethyl silsesquioxane fine powder (see Japanese Patent Application Laid-open No. H7-251124).

In addition, silicone resin compositions blended with a fine silicone rubber powder have also been proposed, examples of which include a composition comprising a non-flowable branched organopolysiloxane, a hydrolysis condensation product of a dialkoxysilane containing an epoxy group, a hydrolysis condensation product of a dialkoxysilane containing an amino group and a fine silicone rubber powder (see Japanese Patent Application Laid-open No. H7-233351), a composition comprising a non-flowable branched organopolysiloxane, a diorganopolysiloxane containing an amino group, a hydrolysis condensation product of a dialkoxysilane containing an epoxy group, a hydrolysis condensation product of a dialkoxysilane containing an amino group, a trialkoxysilane containing a (meth)acryloyl group or an amino group and a fine silicone rubber powder (see Japanese Patent Application Laid-open No. H7-310051), a composition comprising an organopolysiloxane, a hydrolysis condensation product of a dialkoxysilane containing an epoxy group, a hydrolysis condensation product of a dialkoxysilane containing an amino group and a fine silicone rubber powder (see Japanese Patent Application Laid-open No. H8-245882), a composition composed of an organopolysiloxane containing a hydroxyl group, a hydrolysis condensation product of a dialkoxysilane containing an epoxy group, a water-soluble amino compound and a fine silicone rubber powder (see Japanese Patent Application Laid-open No. H9-53047), and a composition comprising an organopolysiloxane containing an alkoxy group or a hydroxyl group, an organotrialkoxysilane, an organoalkoxysilane containing an amide group and a carboxyl group, an organoalkoxysilane containing an epoxy group and a silicone rubber fine powder (see Japanese Patent Application Laid-open No. H11-49955).

Silicone resin compositions blended with a polycarbonate resin fine powder have also been proposed, an example of which is a composition comprising an organopolysiloxane having alkenyl groups, an organohydrogen polysiloxane and a fine polycarbonate resin powder (see Japanese Patent Application Laid-open No. H9-12891).

In addition, silicone resin compositions blended with a fine polyethylene resin powder have also been proposed, an example of which is a composition comprising a curable silicone compoound and a fine polyethylene resin powder (see Japanese Patent Application Laid-open No. 2002-188056).

SUMMARY OF THE INVENTION

As described in the description of the related art, although numerous silicone resin compositions have been proposed that are blended with various types of fine powders, coatings obtained from these silicone resin compositions formed on the surface of a rubber are still inadequate in respect of their effect on improving wear resistance and surface lubricity, thereby resulting in the need for further improvement.

An object of the present invention is to solve the problems suffered by coating compositions for rubber composed of the above-mentioned conventional silicone resin compositions, and obtain a coating composition for rubber that imparts a coating having superior adhesion to rubber as well as superior wear resistance and surface lubricity.

Therefore, in order to achieve the above-mentioned object, the present invention provides a coating composition for rubber comprising an aqueous resin composition containing 100 parts by weight of the following component (A), 10 to 100 parts by weight of the following component (B) and 5 to 150 parts by weight of the following component (C): Component (A):

a curable silicone composition consisting of:

Component (A-1): an organopolysiloxane in which a group selected from the group consisting of a hydroxyl group and groups represented by the formula $R^1O-$ (wherein, $R^1$ is a monovalent hydrocarbon group having 1 to 6 carbon atoms), and a group represented by the following formula (1), are bonded to each of at least two identical terminal silicon atoms of the polysiloxane chain:

(1)

(wherein, $R^2$ is an optionally substituted divalent hydrocarbon group having 1 to 6 carbon atoms, $R^3$ is a divalent hydrocarbon group having 1 to 4 carbon atoms, $R^4$, $R^5$ and $R^6$ are each a hydrogen atom or an optionally substituted monovalent hydrocarbon group having 1 to 10 carbon atoms, m is an integer of 0 to 6, at least one of $R^4$, $R^5$ and $R^6$ is a hydrogen atom when m is not 0, and at least one of $R^5$ and $R^6$ being a hydrogen atom when m is 0).

Component (A-2): an alkoxysilane represented by the following formula (2): and/or a partial hydrolysis-condensation product thereof (2)

(wherein, $R^7$ is an optionally substituted monovalent hydrocarbon group having 1 to 20 carbon atoms, each $R^8$ is, independently from the others, a monovalent hydrocarbon group having 1 to 6 carbon atoms, and a is 0 or 1) in an amount of the component (A-2) relative to the component (A-1) to be sufficient to give 0.5 to 100 moles of the groups denoted by $R^8O-$ therein per mole of the total amount of the hydroxyl groups and the groups denoted by $R^1O-$ in the component (A-1). Component (A-3): 0 to 10 parts by weight of a condensation catalyst per 100 parts by weight of the total amount of component (A-1) and component (A-2);

Component (B): a polyurethane resin in an amount of 10 to 100 parts by weight; and, Component (C): fine organic resin particles having a melting point of 150° C. or higher or having no melting point, and having an average particle diameter of 0.5 to 50 μm in an amount of 5 to 150 parts by weight.

The coating composition for rubber of the present invention forms a coating as being cured by heating after being applied to the surface of a rubber, article and the resulting coating layer exhibits superior adhesion to the rubber and is able to impart superior lubricity and wear resistance to the rubber surface. Coated rubber products are useful as automobile weather strip materials, glass runner materials, O-rings, gaskets, various types of packings and other sealing materials, rubber hose materials and so on due to their superior surface lubricity and wear resistance.

DETAILED DESCRIPTION OF THE PREFERRED EMBODIMENTS

The following provides a more detailed description of the present invention.

The coating composition for rubber of the present invention is a water-base resin composition comprising the component (A), component (B) and component (C) as previously described.

Component (A) of the coating composition for rubber of the present invention is composed of essential components in the form of components (A-1) and (A-2), and an optional component in the form of component (A-3).

The organopolysiloxane of the component (A-1) has a structure in which a group (i) selected from the group consisting of a hydroxyl group and groups represented by the formula $R^1O-$ (wherein, $R^1$ is a monovalent hydrocarbon group having 1 to 6 carbon atoms), and a group (ii) represented by the formula (1) given below are bonded to each of at least two identical terminal silicon atoms of a polysiloxane chain. Although the structure of this organopolysiloxane as the component (A-1) may be linear, branched or cyclic having two or more branches, it should preferably be linear. In the present invention, an organopolysiloxane having an average degree of polymerization of 10 to 2,000 is used for the organopolysiloxane of component (A-1).

(1)

In the organopolysiloxane as the component (A-1), at least one group (i) and at least one group (ii), i.e. a total of two groups, should be bonded to one and the same silicon atom of at least two terminal silicon atoms of the polyxilxane chain. In particular, in the organopolysiloxane of component (A-1), it is preferable for reasons of stability during storage that one each or two each of the above-mentioned group (i) and group (ii) are bonded to 2 or more silicon atoms on the terminals of a polysiloxane chain, preferably 2 to 5 silicon atoms, and more preferably 2 silicon atoms each.

In the above-mentioned group (i), examples of $R^1$ include alkyl groups such as a methyl group, ethyl group, propyl group, isopropyl group, butyl group, tert-butyl group, pentyl group or hexyl group, and preferably a methyl group.

In the formula (1), $R^2$ is an optionally substituted divalent hydrocarbon group having 1 to 6 carbon atoms. Examples of $R^2$ include alkylene groups such as a methylene group, ethylene group, trimethylene group, tetramethylene group, pentamethylene group or hexamethylene group; arylene groups such as a p-phenylene group; and, groups such as a 1-chlorotrimethylene group in which all or a part of the hydrogen atoms of the above-mentioned hydrocarbon groups are substituted with fluorine atoms, chlorine atoms or bromine atoms, and preferably a trimethylene group.

In the formula (1), $R^3$ is a divalent hydrocarbon group having 1 to 4 carbon atoms. Examples of $R^3$ include alkylene groups such as methylene group, ethylene group, trimethylene group or tetramethylene group, and preferably an ethylene group.

In the formula (1), $R^4$, $R^5$ and $R^6$ are each a hydrogen atom or an optionally substituted monovalent hydrocarbon group having 1 to 10 carbon atoms. $R^4$, $R^5$ and $R^6$ may be the same ones or different each from the others, and examples include a hydrogen atom; alkyl groups such as a methyl group, ethyl group, propyl group, isopropyl group, butyl group, tert-butyl group, pentyl group, hexyl group, octyl group or decyl group; cycloalkyl groups such as a cyclopentyl group or a cyclohexyl group; alkenyl groups such as a vinyl group or an allyl group; aryl groups such as a phenyl group or a tolyl group; aralkyl groups such as a benzyl group or a 2-phenylethyl group; and groups such as a 3,3,3-trifluoropropyl group or 3-chloropropyl group in which all or a part of the hydrogen atoms in the above-mentioned hydrocarbon groups are substituted with fluorine atoms, chlorine atoms or bromine atoms, and preferably a hydrogen atom or a methyl group.

In the formula (1), m is an integer of 0 to 6, at least one of $R^4$, $R^5$ and $R^6$ is a hydrogen atom when m is not 0, and at least one of $R^5$ and $R^6$ is a hydrogen atom when m is 0.

Preferable examples of groups represented by the formula (1) specifically include, but are not limited to, the following groups.

—$C_3H_6NH_2$, —$C_3H_6NHC_2H_4NH_2$,

—$C_3H_6(NHC_2H_4)_2NH_2$, —$C_3H_6(NHC_2H_4)_3NH_2$,

—$C_3H_6NHCH_3$, —$C_3H_6NHC_2H_4NHCH_3$

A linear organopolysiloxane represented by the following formula (3) or (4) is preferable for the organopolysiloxane of component (A-1).

(3)

(4)

In the above-mentioned formula (3), each $R^9$ is, independently from the other, a hydrogen atom or a monovalent hydrocarbon group having 1 to 6 carbon atoms. Examples of the monovalent hydrocarbon group denoted by $R^9$ include the same alkyl groups as indicated for $R^1$ such as a methyl group, ethyl group, propyl group, isopropyl group, butyl group, tert-butyl group, pentyl group or hexyl group, and preferably a methyl group.

In the formula (3), $R^{10}$ and $R^{12}$ are independently each a monovalent hydrocarbon group having 1 to 20 carbon atoms.

Examples of $R^{10}$ and $R^{12}$ consist of optionally substituted monovalent hydrocarbon groups having 1 to 20 carbon atoms, and preferably 1 to 6 carbon atoms, including alkyl groups such as a methyl group, ethyl group, propyl group, isopropyl group, butyl group, tert-butyl group, pentyl group, hexyl group, octyl group, decyl group, dodecyl group, tetradecyl group, hexadecyl group, octadecyl group oreicosyl group; cycloalkyl groups such as a cyclopentyl group or cyclohexyl group; alkenyl groups such as a vinyl group or allyl group; aryl groups such as a phenyl group or tolyl group; aralkyl groups such as a benzyl group or 2-phenylethyl group; and halogenoalkyl groups such as a 3,3,3-trifluoropropyl group or 3-chloropropyl group, in which all or a part of the hydrogen atoms in the above-mentioned hydrocarbon groups are substituted with fluorine atoms, chlorine atoms, or bromine atoms. In particular, it is preferable that at least 90% by moles of the groups $R^{12}$ are methyl groups with respect to the industrial availability and good surface releasability.

In addition, in formula (3), $R^{11}$ is a group represented by the above-given formula (1).

In formula (3), n is an integer of 10 to 2,000 and preferably 20 to 1,700. If n is smaller than 10, there is a risk of the resulting coating being brittle, while, if n exceeds 2,000, the organopolysiloxane has an unduly high viscosity and is unable to be uniformly dispersed in the emulsification dispersion system to be described later, resulting in cases in which it is difficult to obtain an emulsion having satisfactory storage stability.

There are no particular limitations on the preparation method of the organopolysiloxane of the component (A-1), and an example of the preparation method consists of carrying out a dealcoholation condensation reaction between an α,ω-dihydroxy dimethylpolysiloxane and a dialkoxysilane having an alkylamino group bonded to the silicon atom.

In addition, in the present invention, an organic acid may be reacted with the organopolysiloxane of component (A-1). Organic acids form amine salts (namely, ion pairs) by reacting with an aminoalkyl group in the organopolysiloxane, and as a result, are able to impart hydrophilicity to the component (A), thereby allowing component (A) to be finely dispersed in an aqueous medium to be described later.

There are no particular limitations on the organic acid provided it is able to form the above-mentioned amine salt, and examples include aliphatic carboxylic acids having 1 to 6 carbon atoms per molecule such as formic acid, acetic acid, propionic acid, malonic acid and citric acid; sulfonic acids having 1 to 6 carbon atoms per molecule such as methanesulfonic acid and ethanesulfonic acid; and, sulfinic acids having 1 to 6 carbon atoms per molecule such as ethanesulfinic acid. Among these, formic acid and acetic acid are preferable. These organic acids can be used singly or two or more kinds can be used in combination.

The amount of the organic acid is preferably 1 molar equivalent or smaller relative to the amino groups in the aminoalkyl groups.

Component (A-2) functions as a crosslinking agent for the component (A-1), and is an alkoxysilane represented by the following formula (2) or a partial hydrolysis-condensation product thereof.

$$R^7_a Si(OR^8)_{4-a} \quad (2)$$

In the formula (2), a is 0 or 1, and $R^7$ is an optionally substituted monovalent hydrocarbon group having 1 to 20 carbon atoms. Examples of $R^7$ consist of optionally substituted monovalent hydrocarbon groups having 1 to 20 carbon atoms, and preferably 1 to 6 carbon atoms, including alkyl groups such as a methyl group, ethyl group, propyl group, isopropyl group, butyl group, tert-butyl group, pentyl group, hexyl group, octyl group, decyl group, dodecyl group, tetradecyl group, hexadecyl group, octadecyl group or eicosyl group; cycloalkyl groups such as a cyclopentyl group or cyclohexyl group; alkenyl groups such as a vinyl group or allyl group; aryl groups such as a phenyl group or tolyl group; aralkyl groups such as a benzyl group or 2-phenylethyl group; and groups in which all or a part of the hydrogen atoms in the hydrocarbon group are substituted with halogen atoms such as fluorine atoms, chlorine atoms or bromine atoms, or a functional group such as a mercapto group, acryloyloxy group or amino group, examples of which include halogenoalkyl groups such as 3,3,3-trifluoropropyl group or 3-chloropropyl group; acryloyloxyalkyl groups such as a γ-methacryloyloxypropyl group or γ-acryloyloxypropyl group; mercaptoalkyl groups such as a γ-mercaptopropyl group; and, aminoalkyl groups such as an N-β-(aminoethyl)-γ-aminopropyl group or γ-aminopropyl group, and preferably a methyl group, phenyl group, vinyl group, γ-acryloyloxypropyl group, γ-methacryloyloxypropyl group or 3,3,3-trifluoropropyl group.

In formula (2), $R^8$ is independently a monovalent hydrocarbon group having 1 to 6 carbon atoms, examples of which include alkyl groups such as a methyl group, ethyl group, propyl group, isopropyl group, butyl group, tert-butyl group, pentyl group or hexyl group, and preferably a methyl group or ethyl group.

Specific examples of the alkoxysilane represented by the formula (2) in the case where a is 1 include methyl trimethoxysilane, methyl triethoxysilane, methyl tripropoxysilane, methyl tributoxysilane, ethyl trimethoxysilane, ethyl triethoxysilane, propyl trimethoxysilane, propyl triethoxysilane, butyl trimethoxysilane, pentyl trimethoxysilane, hexyl trimethoxysilane, octyl trimethoxysilane, decyl trimethoxysilane, dodecyl trimethoxysilane, tetradecyl trimethoxysilane, octadecyl trimethoxysilane, vinyl trimethoxysilane, vinyl triethoxysilane, phenyl trimethoxysilane, phenyl triethoxysilane, 3,3,3-trifluoropropyl trimethoxysilane, γ-acryloyloxypropyl trimethoxysilane, γ-acryloyloxypropyl triethoxysilane, γ-methacryloyloxypropyl trimethoxysilane and γ-methacryloyloxypropyl triethoxysilane while in the case where a is 0, specific examples include tetramethoxysilane, tetraethoxysilane, tetrapropoxysilane, tetrabutoxysilane and partial hydrolysis-condensation products of these alkoxysilanes.

Among these, methyl trimethoxysilane, methyl triethoxysilane, phenyl triethoxysilane phenyl trimethoxysilane, vinyl trimethoxysilane, vinyl triethoxysilane, γ-acryloyloxypropyl trimethoxysilane, γ-acryloyloxypropyl triethoxysilane, γ-methacryloyloxypropyl trimethoxysilane, γ-methacryloyloxypropyl triethoxysilane, 3,3,3-trifluoropropyl trimethoxysilane, 3,3,3-trifluoropropyl triethoxysilane, tetraethoxysilane and tetramethoxysilane are preferable.

In addition, one type of this component (A-2) can be used singly or two or more types can be used in combination.

The component (A-2) is a crosslinking agent for the component (A-1) and serves to form a silicone elastomer as a result of curing by the condensation reaction. Although the condensation reaction is essentially a condensation reaction between the hydroxyl group and $R^1O$— group in the component (A-1) and the $R^8O$— group in the component (A-2), condensation reactions between $R^8O$— groups in the component (A-2) are also included.

The amount of the component (A-2) used relative to the component (A-1) is such that the amount of the $R^8O$— groups in the component (A-2) is normally 0.5 to 100 moles, and preferably 1.0 to 50 moles, relative to 1 mole of the hydroxyl groups and $R^1O$— groups in the component (A-1).

If the amount of the component (A-2) used is too small, the condensation curing reaction proceeds inadequately, and there are cases in which it is not possible to obtain a silicone elastomer. In addition, if the amount of component (A-2) used is too large, the hardness of the cured product is unduly high resulting in lack of elasticitity, and there are cases in which the amount of by-product in the form of an alcohol would be increased.

The component (A-3) is a condensation catalyst for promoting the condensation reaction, and is selected from one or more types of metal compounds including a sodium compounds, aluminum compounds, potassium compounds, calcium compounds, vanadium compounds, iron compounds, cobalt compounds, nickel compounds, zirconium compounds and barium compounds. Various zinc compounds can also be used as a class of preferable component (A-3).

Specific examples of this condensation catalyst include carboxylic acid metal salts such as sodium 2-ethyl hexanoate, aluminum 2-ethyl hexanoate, potassium 2-ethyl hexanoate, calcium 2-ethyl hexanoate, vanadium 2-ethyl hexanoate, iron 2-ethyl hexanoate, cobalt 2-ethyl hexanoate, nickel 2-ethyl hexanoate, zinc 2-ethyl hexanoate, zirconium 2-ethyl hexanoate, barium 2-ethyl hexanoate, sodium neodecanoate, aluminum neodecanoate, potassium neodecanoate, calcium neodecanoate, vanadium neodecanoate, iron neodecanoate, cobalt neodecanoate, nickel neodecanoate, zinc neodecanoate, zirconium neodecanoate, barium neodecanoate, sodium oleate, aluminum oleate, potassium oleate, calcium oleate, vanadium oleate, iron oleate, cobalt oleate, nickel oleate, zinc oleate, zirconium oleate, barium oleate, sodium naphthenate, aluminum naphthenate, potassium naphthenate, calcium naphthenate, vanadium naphthenate, iron naphthenate, cobalt naphthenate, nickel naphthenate, zinc naphthenate, zirconium naphthenate and barium naphthenate; organometallic complexes such as aluminum acetyl acetonate, calcium acetyl acetonate, cobalt acetyl acetonate, iron acetyl acetonate, nickel acetyl acetonate, zinc ethyl acetoacetonate, zinc acetyl acetonate, zirconium acetyl acetonate, aluminum ethyl acetoacetonate, calcium ethyl acetoacetonate, cobalt ethyl acetoacetonate, iron ethyl acetoacetonate, nickel ethyl acetoacetonate, zinc ethyl acetoacetonate and zirconium ethyl acetoacetonate; inorganic metal salts such as sodium chloride, aluminum chloride, potassium chloride, calcium chloride, vanadium chloride, iron chloride, cobalt chloride, nickel chloride, zinc chloride, zirconium chloride, barium chloride, sodium sulfate, aluminum sulfate, potassium sulfate, calcium sulfate, vanadium sulfate, iron sulfate, cobalt sulfate, nickel sulfate, zinc sulfate, zirconium sulfate, barium sulfate, sodium nitrate, aluminum nitrate, potassium nitrate, calcium nitrate, vanadium nitrate, iron nitrate, cobalt nitrate, nickel nitrate, zinc nitrate, zirconium nitrate, barium nitrate, sodium phosphate, aluminum phosphate, potassium phosphate, calcium phosphate, vanadium phosphate, iron phosphate, cobalt phosphate, nickel phosphate, zinc phosphatem zirconium phosphate, barium phosphate, sodium carbonate, aluminum carbonate, potassium carbonate, calcium carbonate, vanadium carbonate, iron carbonate, cobalt carbonate, nickel carbonate, zinc carbonate, zirconium carbonate and barium carbonate; and, metal hydroxides such as sodium hydroxide, aluminum hydroxide, potassium hydroxide, calcium hydroxide, vanadium hydroxide, iron hydroxide, cobalt hydroxide, nickel hydroxide, zinc hydroxide, zirconium hydroxide and barium hydroxide. One type of these compounds can be used singly or two or more types can be used in combination.

Although tin compounds can also be used singly or in combination with other compounds, they are not considered to be preferable since their toxicity has come to be viewed as a problem in recent years.

The compounding amount of the component (A-3) is normally 0 to 10 parts by weight, and preferably 0 to about 2 parts by weight, relative to 100 parts by weight of the total of the component (A-1) and component (A-2). In the case of compounding the same, the effective amount is normally 0.1 parts by weight or larger, and in the case where the reactivity of the component (A-1) and the component (A-2) is high, the component (A-3) can be omitted or can be used only in a trace amount. Since there is an increase of only very little degree in the effect even if the compounded amount of the component (A-3) is excessively large, this is economically disadvantageous.

Furthermore, in cases in which catalyst activity is low and adequate curing cannot be accomplished with the component (A-3) alone, an amine compound or an amino group-containing alkoxysilane can also be added as a co-catalyst.

It is necessary to convert the component (A) into an aqueous emulsion and then to blend with the component (B) and component (C) in order to obtain the coating composition for rubber of the present invention in the form of a water-base resin composition. An aqueous emulsion of the component (A) can be obtained by emulsification of the above-described components (A-1), (A-2) and (A-3) or the components (A-1) and (A-2) in water using a surfactant.

There are no particular limitations on the surfactant used in this case, but nonionic surfactants, cationic surfactants and amphoteric surfactants are preferable. Examples of nonionic surfactants include polyoxyethylene alkyl ethers, polyoxyethylene-polyoxypropylene alkyl ethers, polyoxyethylene alkylphenyl ethers, polyethylene glycol fatty acid esters, sorbitan fatty acid esters, polyoxyethylene sorbitan fatty acid esters, glycerin fatty acid esters, polyoxyethylene glycerin fatty acid esters, polyglycerin fatty acid esters, polypropylene glycol fatty acid esters, polyoxyethylenecastor oil, polyoxyethylene hydrogenated castor oil, polyoxyethylene hydrogenated castor oil fatty acid esters, polyoxyethylene alkyl amines, polyoxyethylene fatty acid amides, polyoxyethylene-modified organopolysiloxanes, polyoxyethylene- and polyoxypropylene-modified organopolysiloxanes, examples of cationic surfactants include alkyl trimethyl ammonium salts, dialkyl dimethyl ammonium salts, polyoxyethylene alkyl dimethyl ammonium salts, dipolyoxyethylene alkyl methyl ammonium salts, tripolyoxyethylene alkyl ammonium salts, alkyl benzyl dimethyl ammonium salts, alkyl pyridium salts, monoalkyl amine salts and monoalkyl amide amine salts, and examples of amphoteric surfactants include alkyl dimethyl amine oxides, alkyl dimethyl carboxybetaines, alkyl amide propyl dimethyl carboxybetaines, alkyl hydroxysulfobetaines and alkyl carboxymethylhydroxyethyl imidazolinium betaines. One kind of these surfactants can be used singly or two or more kinds can be used in combination.

In order to obtain an aqueous emulsion of the component (A) from components (A-1), (A-2) and (A-3) using a surfactant, a mixture of an organopolysiloxane as the component (A-1), an alkoxysilane and/or its partial hydrolysiscondensation product as the component (A-2) and a metal compound as the component (A-3) should be emulsified and dispersed in water using a surfactant. In preparing the aqueous emulsion of the component (A), in the case where the curing reaction of the component (A-1) proceeds prior to adequately forming a uniform aqueous emulsion, thereby preventing emulsification and dispersion, the aqueous emulsion of the component (A) should be prepared by a method in which the component (A-1) is first emulsified and dispersed in water using the surfactant followed by the addition of the components (A-2) and (A-3) and stirring, a method in which a mixture of the components (A-1) and (A-2) is first emulsified and dispersed in water using a surfactant followed by the addition of the component (A-3) and stirring, or a method in which a mixture of the components (A-1) and (A-3) is first emulsified and dispersed in water using the surfactant followed by the addition of the component (A-2) and stirring.

In addition, in the case where the component (A-3) is soluble in water, a method should be undertaken in which the component (A-1) or a mixture of the components (A-1) and (A-2) is emulsified and dispersed in water followed by the addition of the component (A-3), or a method should be undertaken in which the component (A-3) is dissolved in water followed by emulsification and dispersion of the component (A-1) or components (A-1) and (A-2) in this aqueous solution.

In order to obtain an aqueous emulsion of the component (A) from the components (A-1) and (A-2) using a surfactant, a mixture of the organopolysiloxane as the component (A-1) and the alkoxysilane and/or a partial hydrolysis condensation product thereof should be emulsified and dispersed in water using the surfactant. In preparing an aqueous emulsion of the component (A), in the case where the curing reaction of the component (A-1) proceeds thereby preventing emulsification and dispersion, the aqueous emulsion of the component (A) should be prepared by first emulsifying and dispersing the component (A-1) in water using a surfactant followed by the addition of the component (A-2) and stirring.

A stirrer machine such as propeller blade stirrers, paddle blade stirrers, homomixers and dispermixers, or emulsification machines such as high-pressure homogenizers, colloid mills and ultrasonic emulsifiers can be used for the purpose of emulsification and dispersion.

The total compounding amount of the components (A-1) and (A-2) in the aqueous emulsion of the component (A) should usually be 5 to 80% by mass or preferably about 10 to 60% by weight. If the compounding amount is too small, the process is uneconomical, while on the other hand, if the compounding amount is too large, the viscosity of the aqueous emulsion would be unduly high resulting in difficulties encountered in handling.

The component (B) is a component which improves the adhesion between the rubber surface and a coating obtained by applying the coating composition to a rubber article according to the present invention and improves the wear resistance of said coating, and is a polyurethane resin obtained by an addition reaction between a polyol (a compound containing two or more hydroxyl (—OH) groups in a molecule) and a polyisocyanate (a compound containing two or more isocyanate (—NCO) groups in a molecule).

Examples of the above-mentioned polyol include polyester polyols, polyether polyols, polycarbonate polyols, polycaprolactone polyols, polythioether polyols, polyacetal polyos, polytetramethylene glycol, polybutadiene polyols, polyisoprene polyoles, hydrogenated polybutadiene polyoles and castor oil polyols, and mixtures thereof can also be used. Among these, polyester polyoles and polyether polyols are preferable.

The number-average molecular weight of the above-mentioned polyols is preferably within the range of 400 to 5,000.

Examples of the above-mentioned polyisocyanate which can be used include aromatic polyisocyanates such as diphenylmethane diisocyanate, polymethylene polyphenylene polyisocyanate, tolylene diisocyanate, polytolylene polyisocyanate, xylylene diisocyanate or naphthalene diisocyanate;

aliphatic polyisocyanates such as hexamethylene diisocyanate, cyclic polyisocyanates such as dicyclohexyl methane diisocyanate, and, isophorone diisocyanate or hydrogenated xylylene diisocyanate. In addition, polyisocyanates obtained by modifying the above-mentioned polyisocyanates with a carbodiimide and polyisocyanates obtained by modifying the above-mentioned polyisocyanates with an isocyanurate can also be used. These can be used singly or as a mixture of two kinds or more thereof. Among these, diphenyl methane diisocyanate, tolylene diisocyanate and hexamethylene diisocyanate are particularly preferable.

It is necessary to convert the component (B) into an aqueous emulsion or aqueous solution and then blend with the component (A) and component (C) in order to obtain a coating composition for rubber of the present invention in the form of an aqueous resin composition. An aqueous emulsion or aqueous solution of the component (B) can be obtained by an addition reaction of a polyol and an excess amount of a polyisocyanate in a molar ratio of polyol to polyisocyanate of 1:1.1 to 1:10 and preferably 1:1.3 to 1:5 to synthesize a urethane prepolymer having an isocyanate group on its molecular terminals, followed by emulsification and dispersion or dissolution of said urethane prepolymer in water using a surfactant. If the molar ratio of the polyol to the polyisocyanate is smaller than 1:1.1, sequential addition polymerization occurs easily resulting in the formation of high molecular weight polymerswhile, if the molar ratio is larger than 1:10, the residual amount of free isocyanate increases, resulting in cases of decreased stability during storage.

There are no particular limitations on the above-mentioned surfactant, and the previously listed nonionic surfactants, cationic surfactants and amphoteric surfactants are preferable. In addition, the emulsification and dispersion or dissolution should be carried out using the above-mentioned emulsification machines.

In the case of preparing an aqueous emulsion or aqueous solution of the component (B), in addition to the above-mentioned polyols and polyisocyanates, a compound having an active hydrogen atom and a salt-forming group which reacts with the isocyanate groups may be synthesized, and the resulting urethane prepolymer may be emulsified or dissolved in water using a salt-forming agent.

Examples of the compounds having an active hydrogen atom and a salt-forming group that react with isocyanate groups include hydroxy acids, aminocarboxylic acids, aminosulfonic acids and hydroxysulfonic acids, and their corresponding salt-forming agents include metal hydroxides, ammonia and tertiary amines.

In addition, examples of the compound having an active hydrogen atom and a salt-forming group which reacts with isocyanates other than those indicated above include amino alcohols and amines, and examples of the compound having a salt-forming group corresponding thereto include organic acids, inorganic acids and compounds having reactive halogen atoms.

Further, examples of the compound having an active hydrogen atom and a salt-forming group which react with isocyanates other than those indicated above include alcohols having a halogen atom, and their corresponding salt-forming group include tertiary amines, sulfides and phosphines. In this method, it is optional that the above-mentioned surfactants are used jointly. The salt-forming agent is added usually in an equivalent amount.

In addition, in the case of preparing an aqueous emulsion or aqueous solution of the component (B), the above-mentioned polyol and polyisocyanate as well as a polyoxyethylene monoalkyl ether and/or polyoxyethylene-polyoxypropylene monoalkyl ether can be used, and the resulting urethane prepolymer can be emulsified or dissolved in water. In this method, the above-mentioned surfactants may also be used.

The urethane prepolymer in an aqueous emulsion or aqueous solution can be converted to a polymer of an increased molecular weight by the reaction with water of the polyurethane resin as the component (B) either by polymerization or reaction with water or converted to a higher polymer by the reaction with a polyvalent amine compound added to the aqueous emulsion or aqueous solution and polymerizing by reacting with the polyvalent amine compound so as to form an aqueous emulsion or a solution of a polyurethane resin as the component (B).

The polyurethane resin as the component (B) obtained in this manner preferably has a number-average molecular weight within the range of 4,000 to 100,000.

The compounding amount of the component (B) is 10 to 100 parts by weight or, preferably, 15 to 80 parts by weight or, particularly preferably, 20 to 60 parts by weight, relative to 100 parts by weight of the component (A). If the blended amount of component (B) is smaller than 10 parts by weight, the coating obtained from the coating composition is poor in adhesion to a rubber surface, the strength of the coating layer decreases and wear resistance becomes poor, while, if the compounding amount exceeds 100 parts by weight, the coating obtained from the coating composition has decreased surface lubricity and wear resistance, lacks flexibility and is unable to follow the deformation of the rubber article.

The component (C) of the inventive composition is a component which improves surface lubricity, and consists of organic resin fine particles.

The melting point of the organic resin fine particles should be 150° C. or higher or, preferably, 180° C. or higher or, particularly preferably, 200° C. or higher, or resin particles showing no definite melting point can also be used. If the melting point of the organic resin fine particles is lower than 150° C., the configuration of the organic resin fine particles is so deformed that the surface lubricity of the resulting coating decreases.

In addition, if the hardness of the organic resin particles is excessively high, since there may be a possible trouble of it damaging the surface of the material that is rubbed against the coated surface obtained with the inventive composition, a relatively soft resin or a resin having rubbery elasticity is preferable for the organic resin that composes the organic resin fine particles.

In addition, the configuration of the organic resin particles is preferably spherical, and the average particle diameter is 0.5 to 50 μm or, preferably. 1 to 20 μm or, particularly preferably, 2 to 15 μm. If the average particle diameter is smaller than 0.5 μm, surface lubricity would be poor, while, if the average particle diameter exceeds 50 μm, the coating strength decreases and wear resistance would be poor.

There are no particular limitations on the material of the organic resin provided it satisfies the above-mentioned requirements, and preferable examples include polyamide resins such as nylon 6 and nylon 66, crosslinked polyurethane resins such as polymers of a polyol, polyisocyanate and a tervalent or higher amine compound, crosslinked acrylic resins such as polymers of an alkyl (meth)acrylate and a polyfunctional polymerizeable compound, acrylurethane resins as a polymer of an acrylic polyol and polyisocyanate polymerized by using 2-ethylhexyl (meth)acrylate, 2-hydroxypropyl (meth)acrylate and the like as the monomer, 2-hydroxyethyl (meth)acrylate or 2-hydroxypropyl (meth)acrylate, and fluororesins such as polytetrafluoroethylene, polychlorotrifluoroethylene and tetrafluoroethylene-hexafluoropropylene copolymers and the like.

A method in which a solid organic resin is mechanically crushed, emulsion polymerization, suspension polymerization, dispersion polymerization, spray drying, liquid solidification, solvent evaporation or dissolution dispersion cooling, for example, can be used for the preparation of the organic resin fine particles as the component (C).

The compounding amount of the component (C) is 5 to 150 parts by weight or, preferably, 10 to 120 parts by weight or, particularly preferably, 20 to 100 parts by weight per 100 parts by weight of the component (A). If the compounding amount of the component (C) is smaller than 5 parts by weight, the coating obtained from the coating composition for rubber of the present invention has poor surface lubricity and poor wear resistance, while if the compounding amount exceeds 150 parts by weight, coating strength decreases and wear resistance becomes poor.

In addition to the above-mentioned components (A), (B) and (C), the coating composition for rubber of the present invention can also be compounded with optional components such as a silicone resin powder, carbon black, paraffin wax, polyethylene wax, silicone oil, various organic or inorganic pigments, wetting agent, thickener, defoaming agent and antiseptic agent.

The coating composition for rubber of the present invention is obtained by dispersing and mixing the above-mentioned components (A), (B) and (C) in water. Although the component (C) may be compounded as such, it is necessary to blend the components (A) and (B) by first converting to an aqueous emulsion in which they are emulsified and dispersed in water as previously described. Component (C) may also be blended after emulsifying and dispersing in water by using a surfactant or other dispersion aid in advance.

Mixing of each of the above-mentioned components should be carried out with a conventional known mixing stirrer equipped with a paddle-type, anchor-type or other type of stirring blades. Thereafter, the mixture should be diluted by adding water if necessary.

There are no particular limitations on the rubber to which the coating composition for rubber of the present invention can be applied, and examples include natural rubber as well as various types of synthetic rubbers such as EPDM, SBR, NBR, butadiene rubbers, butyl rubbers, chloroprene rubbers, isoprene-isobutylene rubbers, nitrile rubbers, silicone rubbers, urethane rubbers and fluorine rubbers. In addition, there are also no limitations whatsoever on the form of the rubber article and it may be, for example, porous or non-porous.

Examples of the method for applying the coating composition for rubber of the present invention onto the surface of a rubber article include brush coating, spray coating, roll coating, flow coating, dip coating and knife coating. In the case of using the coating composition for rubber of the present invention, after coating with said coating composition onto the rubber surface using these methods, the coating composition is cured by heating and drying to form a coating layer. The thickness of the resulting coating layer is preferably within the range of 0.1 to 20 µm, and particularly preferably within the range of 0.5 to 10 µm.

Although the following provides a detailed explanation of the present invention by indicating measurement methods, preparation examples, examples and comparative examples, the present invention is never limited to the following examples. Furthermore, the values of viscosity indicated in the following examplesall refer to the value obtained by measuring at 25° C. by using an Ostwald viscometer.

Measurement Methods

1. Surface Lubricity

Figure 1:
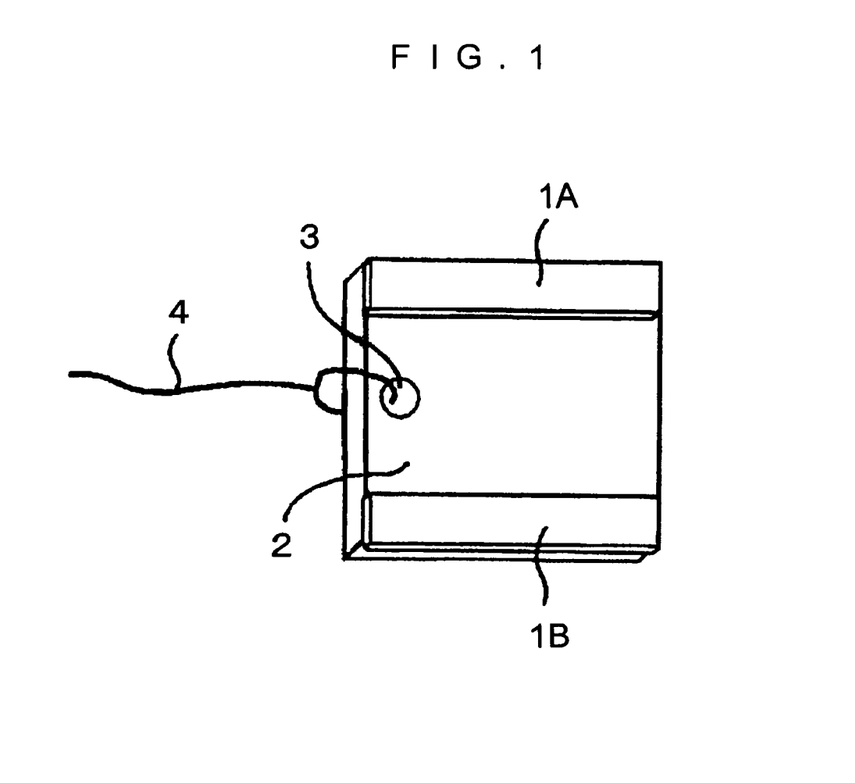
FIG. 1 is a perspective view showing a test specimen used to evaluate surface lubricity of a coated rubber piece.

As shown in FIG. 1, each one surface of two EPDM rubber sheets 1A and 1B (10 mm×50 mm, thickness: 2 mm) was coated with the aqueous resin composition described later by brush coating, and they were bonded, with a double-sided adhesive tape, on the uncoated surface to a 0.3 mm thick, 50 mm by 50 mm wide square iron plate 2 along the opposing sides of the nearly square iron plate 2s to prepare a test specimen. An opening 3 (radius: 1 mm) was provided near one of the other two sides of this iron plate 2, and a string 4 (length: 50 mm) was passed through the opening 3 so as to enable pulling of the test specimen.

Figure 2:
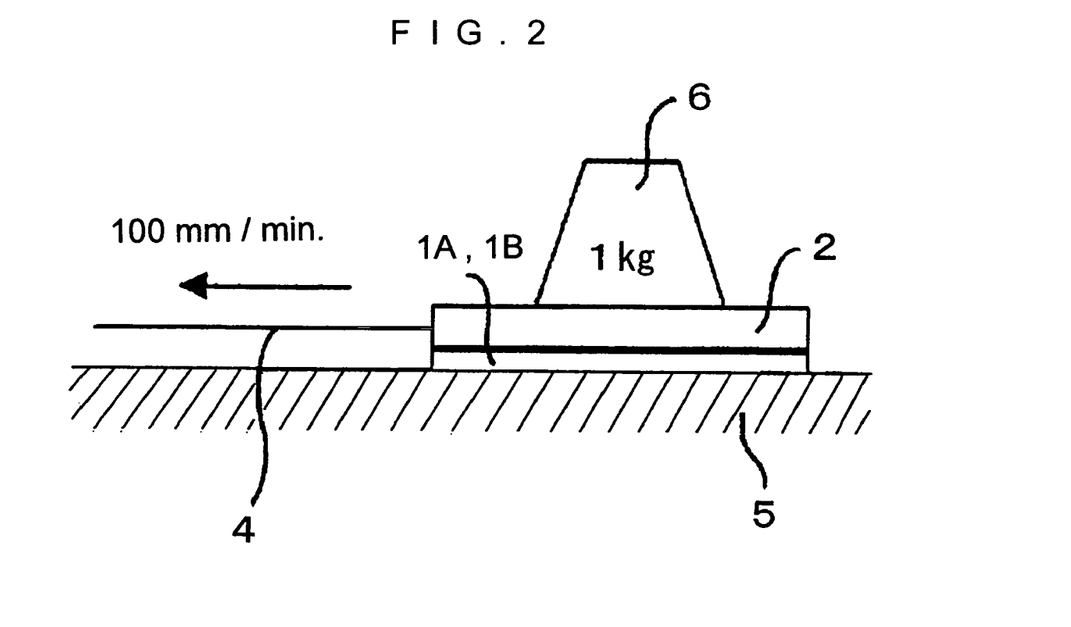
FIG. 2 is a drawing showing a method for measurement of the kinetic friction coefficient using the test specimen above; and, FIG. 3 is a drawing illustrating a method for measurement of wear resistance of the coating.

Next, as shown in FIG. 2, with the flat surface to which the rubber sheets 1A and 1B were affixed facing downward, the test specimen was placed on a glass plate 5 (60 mm×190 mm, thickness: 3 mm) and a weight 6 (weight: 1 kg) was mounted thereon. Subsequently, the test specimen was moved on the glass plate 5 by pulling with the string 4 horizontally in the direction of pulling 7 (shown by arrow) at a moving speed of 100 mm/minute. The kinetic friction coefficient was then determined between the coated surface of the rubber sheets 1A and 1B and the glass plate 5 at this time.

2. Adhesion

Figure 3:
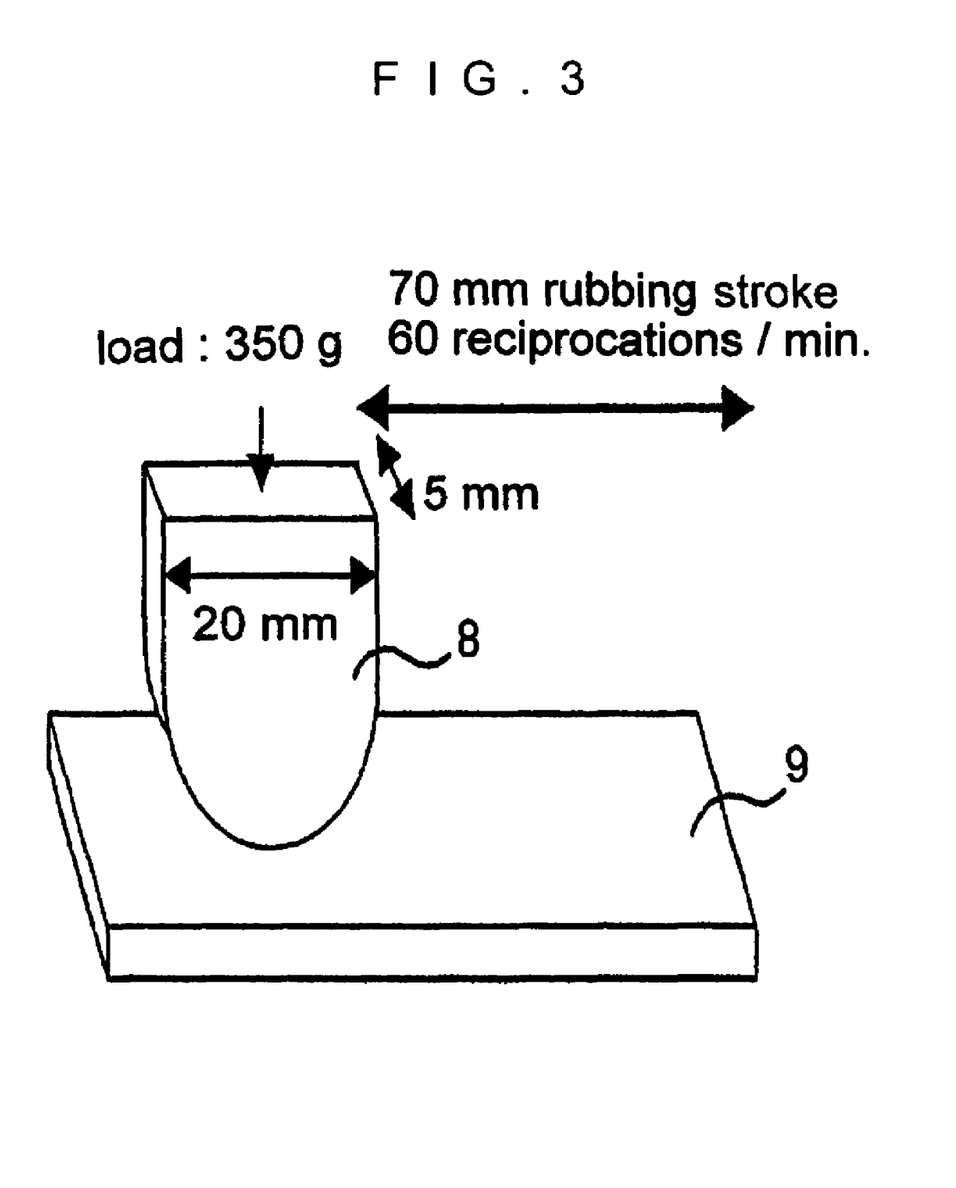

A coating layer was formed by coating the surface of a rubber sheet (15 mm×150 mm, thickness: 2 mm) with the aqueous coating composition described later and then the coated surface was strongly rubbed twice with the thumb to find peeling of the coating layer 3. Wear Resistance As shown in FIG. 3, a glass probe 8 (linear contact, length of contacting line: 5 mm), having the surface roughened by grinding with sandpaper (No. AA80), was put onto the coated surface of a test specimen 9 that passed the above-mentioned adhesion test without peeling of the coating layer, under a contacting load of 350 g and the coated surface was rubbed repeatedly with the glass probe 8. Thus, the coated surface was rubbed with the glass probe back and forth under the conditions of a rubbing frequency of 60 reciprocations/minute and rubbing stroke of 70 mm and visually inspevted after every 50reciprocations followed by recording of the number of rubbing reciprocations by which shaving off of the coating layer was first noted.

PREPARATION EXAMPLES

Component A

Preparation Example 1

350 g of an organopolysiloxane having a viscosity of 65 mm$^2$/s represented by the following formula (5) and 50 g of vinyl trimethoxysilane were taken in a 1,000 ml glass beaker and they were agitated with a homomixer for 5 minutes. Next, 20 g of polyoxyethylene decyl ether (4 moles addition of ethylene oxide), 15 g of polyoxyethylene decyl ether (40 moles addition ethylene oxide) and 265 g of water were added to the beaker followed by agitation for 15 minutes with a homomixer and passing twice through a high-pressure homogenizer set to a pressure of 30 MPa to obtain a silicone aqueous emulsion (curable silicone aqueous emulsion A-1).

After 24 hours fromr preparation of this silicone aqueous emulsion, a few grams thereof were taken in a petri dish to obtain a solid by evaporation of water taking 24 hours at room temperature. This solid was noted to be free of tackiness by finger touch having elastic resilience.

(5)

(In the formula, $R^{13}$ is a group expressed by $-C_3H_6NHC_2H_4NH_2$)

Preparation Example 2

350 g of the organopolysiloxane having a viscosity of 65 mm$^2$/s expressed by the above-given formula (5) and 35 g of vinyl trimethoxysilane were introduced into a 1,000 ml glass beaker and they were agitated with a homomixer for 5 minutes. Next, 20 g of polyoxyethylene decyl ether (4 moles addition of ethylene oxide), 15 g of polyoxyethylene decyl ether (40 moles addition of ethylene oxide) and 280 g of water were added followed by agitation for 15 minutes with a homomixer and passing twice through a high-pressure homogenizer set to a pressure of 30 MPa to obtain a silicone aqueous emulsion (curable silicone aqueous emulsion A-2).

After 24 hours from preparation of this silicone aqueous emulsion, a few grams thereof were taken in a petri dish which was kept standing for 24 hours at room temperature to obtain a solid by evaporation of water. This solid was found to be free of tackiness by finger touch and to have elastic resilience.

Preparation Example 3

350 g of the organopolysiloxane having a viscosity of 65 mm$^2$/s expressed by the above-given formula (5) and 50 g of phenyl trimethoxysilane were introduced into a 1,000 ml glass beaker and they were agitated with a homomixer for 5 minutes. Next, 20 g of polyoxyethylene decyl ether (4 moles addition of ethylene oxide), 15 g of polyoxyethylene decyl ether (40 moles addition of ethylene oxide) and 265 g of water were added thereto followed by agitation for 15 minutes with a homomixer and then passing twice through a high-pressure homogenizer set to a pressure of 30 MPa to obtain a silicone aqueous emulsion (curable silicone aqueous emulsion A-3).

After 24 hours from preparation of this silicone aqueous emulsion, a few grams thereof were taken in a petri dish to obtain a solid with evaporation of water by standing for 24 hours at room temperature. This solid was found to be free of tackiness by finger touch and to have elastic resilience.

Preparation Example 4

350 g of the organopolysiloxane having a viscosity of 65 mm$^2$/s expressed by the above-given formula (5) and 35 g of tetramethoxysilane were introduced into a 1,000 ml glass beaker and they were agitated with a homomixer for 5 minutes. Next, 20 g of polyoxyethylene decyl ether (4 moles addition of ethylene oxide), 15 g of polyoxyethylene decyl ether (40 moles addition of ethylene oxide) and 280 g of water were added thereto and they were agitated for 15 minutes with a homomixer and passed twice through a high-pressure homogenizer set to a pressure of 30 MPa to obtain a silicone aqueous emulsion (curable silicone aqueous emulsion A-4).

After 24 hours from preparation of this silicone aqueous emulsion, a few grams thereof were taken in a petri dish to obtain a solid with evaporation of water by standing for 24 hours at room temperature. This solid was found to be free of tackiness by finger touch and to have elastic resilience.

Preparation Example 5

280 g of an organopolysiloxane having a viscosity of 770 mm$^2$/s expressed by the following formula (6) and 11 g of vinyl trimethoxysilane were introduced into a 1,000 ml glass beaker and they were agitated with a homomixer for 5 minutes. Next, 16 g of polyoxyethylene decyl ether (4 moles addition of ethylene oxide), 12 g of polyoxyethylene decyl ether (40 moles addition of ethylene oxide), 3 g of a 10% aqueous potassium carbonate solution and 378 g of water were added thereto and they were agitated for 15 minutes with a homomixer and passed twice through a high-pressure homogenizer set to a pressure of 100 MPa to obtain a silicone aqueous emulsion (curable silicone aqueous emulsion A-5).

After 24 hours from preparation of this silicone aqueous emulsion, a few grams thereof were taken in a petri dish to obtain a solid with evaporation of water by standing for 24 hours at room temperature. This solid was found to be free of tackiness by finger touch and to have elastic resilience.

(6)

(In the formula, $R^{13}$ is a group expressed by $-C_3H_6NHC_2H_4NH_2$).

Preparation Example 6

280 g of an organopolysiloxane having a viscosity of 11,400 mm$^2$/s expressed by the following formula (7) and 11 g of vinyl trimethoxysilane were introduced into a 1,000 ml glass beaker and they were agitated with a homomixer for 5 minutes. Next, 16 g of polyoxyethylene decyl ether (4 moles addition of ethylene oxide), 12 g of polyoxyethylene decyl ether (40 moles addition of ethylene oxide) and 25 g of water were added thereto and they were agitated with a homomixer to note a viscosity increase. Further, 3 g of a 10% aqueous potassium carbonate solution were added and then kneaded and agitated for 10 minutes with a dispermixer followed by diluting by adding 353 g of water to obtain a silicone aqueous emulsion (curable silicone aqueous emulsion A-6).

After 24 hours from preparation of this silicone aqueous emulsion, a few grams thereof were taken in a petri dish to obtain a solid by evaporation of warer taking 24 hours at room temperature. This soild was found to be free of tackiness by finger touch and to exhibit elastic resilience.

(7)

(wherein, $R^{13}$ is a group expressed by $-C_3H_6NHC_2H_4NH_2$).

Preparation Example 7

280 g of an organopolysiloxane having a viscosity of 112,000 mm²/s expressed by the following formula (8) and 11 g of vinyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, 3 g of a 10% aqueous potassium carbonate solution were added to be kneaded and agitated for 10 minutes with a dispermixer followed by dilution with addition of 357 g of water to obtain a silicone aqueous emulsion (curable silicone aqueous emulsion A-7).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

(8)

(wherein, $R^{13}$ is a group expressed by $-C_3H_6NHC_2H_4NH_2$).

Preparation Example 8

280 g of an organopolysiloxane having a viscosity of 112,000 mm²/s expressed by the above-given formula (8) and 11 g of γ-acryloyloxypropyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, 3 g of a 10% aqueous potassium carbonate solution were added to the mixtutr which was kneaded and agitated for 10 minutes with a dispermixer followed by dilution with addition of 357 g of water to obtain a silicone aqueous emulsion (curable silicone aqueous emulsion A-8).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

Preparation Example 9

280 g of an organopolysiloxane having a viscosity of 112,000 mm²/s expressed by the above-given formula (8) and 11 g of 3,3,3-trifluoropropyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, 3 g of a 10% aqueous potassium carbonate solution were added to be kneaded and agitated for 10 minutes with a dispermixer followed by dilution with addition of 357 g of water to obtain a silicone aqueous emulsion (curable silicone aqueous emulsion A-9).

After 24 hours from preparation of the silicone aqueous emulsion, a few grams thereof were taken in a petri dish to obtain a solid by evaporation of water taking 24 hours at room temperature. This solid was found to be free of tackiness by finger touch and exhibited elastic resilience.

Preparation Example 10

280 g of an organopolysiloxane having a viscosity of 112,000 mm²/s expressed by the above-given formula (8) and 5 g of a mineral spirits solution of iron 2-ethylhexanoate (iron content: 8% as metal) were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, after kneading and agitation for 10 minutes with a dispermixer, the mixture was diluted by the addition of 355 g of water followed by the addition of 11 g of methyl trimethoxysilane and agitation for 1 hour with an anchor-blade stirrer to obtain a silicone aqueous emulsion (curable silicone aqueous emulsion A-10).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

Preparation Example 11

280 g of an organopolysiloxane having a viscosity of 112,000 mm²/s expressed by the above-given formula (8) and 11 g of methyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, after kneading and agitation for 10 minutes with a dispermixer, the mixture was diluted by adding 354 g of water followed by addition of 6 g of a mineral spirits solution of zirconium 2-ethylhexanoate (zirconium content: 12% as metal) and agitation for 1 hour with an anchor-blade stirrer to obtain a silicone aqueous emulsion (curable silicone aqueous emulsion A-11).

After 24 hours from preparation oh this silicone aqueous emulsion, a few grams thereof were taken in a petri dish to obtain a solid by evaporation of water taking 24 hours at room temperature. This solid was found to be free of tackiness by finger touch and exhibited elastic resilience.

Preparation Example 12

280 g of an organopolysiloxane having a viscosity of 112,000 mm²/s expressed by the above-given formula (8) and 11 g of methyl trimethoxysilane were introducd into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, after kneading and agitation for 10 minutes with a dispermixer, the mixture was diluted by adding 342 g of water followed by addition of 18 g of a toluene solution of vanadium naphthenate (vanadium content: 2% as metal) and agitation for 1 hour with an anchor-blade stirrer to obtain a silicone aqueous emulsion (curable silicone aqueous emulsion A-12).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

Preparation Example 13

280 g of an organopolysiloxane having a viscosity of 112,000 mm²/s expressed by the above-given formula (8) and 11 g of methyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, after kneading and agitation of the mixture for 10 minutes with a dispermixer, the mixture was diluted by adding 353 g of water followed by addition of 7 g of a toluene solution of nickel 2-ethylhexanoate (nickel content: 6% as metal) and agitation for 1 hour with an anchor-blade stirrer to obtain a silicone aqueous emulsion (curable silicone aqueous emulsion A-13).

After 24 hours from preparation of this silicone aqueous emulsion, a few grams thereof were taken in a petri dish to obtain a solid by evaporation of warwe taking 24 hours at room temperature. This solid was found to be free of tackiness by finger touch and exhinited elastic resilience.

Preparation Example 14

280 g of an organopolysiloxane having a viscosity of 112,000 mm 2/s expressed by the above-given formula (8) and 11 g of methyl trimethoxysilane were imtroduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, after kneading and agitation for 10 minutes with a dispermixer, the mixture was diluted by the addition of 348 g of water followed by the addition of 12 g of a toluene solution of barium 2-ethylhexanoate (barium content: 8% as metal) and agitation for 1 hour with an anchor-blade stirrer to obtain a silicone aqueous emulsion (curable silicone aqueous emulsion A-14).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

Preparation Example 15

280 g of an organopolysiloxane having a viscosity of 112,000 mm²/s expressed by the above-given formula (8) and 11 g of methyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, after kneading and agitation for 10 minutes with a dispermixer, the mixture was diluted by adding 356 g of water followed by the addition of 4 g of a mineral spirit solution of cobalt 2-ethylhexanoate (cobalt content: 12% as metal) and agitation for 1 hour with an anchor-blade stirrer to obtain a silicone aqueous emulsion (curable silicone aqueous emulsion A-15).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience Preparation Example 16

280 g of an organopolysiloxane having a viscosity of 232,000 mm²/s expressed by the formula (9) given below and 11 g of methyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, 1 g of calcium chloride dihyrate wasadded thereto under kneading and agitation for 10 minutes with a dispermixer followed by dilution of the mixture with addition of 359 g of water to obtain a silicone aqueous emulsion (curable silicone aqueous emulsion A-16).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

(9)

(wherein, $R^{13}$ is a $-C_3H_6NHC_2H_4NH_2$ group).

Preparation Example 17

280 g of an organopolysiloxane having a viscosity of 232,000 mm²/s expressed by the above-given formula (9) and 2 g of aluminum dibutoxyacetyl acetonate were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, after kneading and agitation for 10 minutes with a dispermixer, the mixture was diluted by adding 358 g of water followed by the addition of 11 g of methyl trimethoxysilane and agitation for 1 hour with an anchor-blade stirrer to obtain a silicone aqueous emulsion (curable silicone aqueous emulsion A-17).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

Preparation Example 18

280 g of an organopolysiloxane having a viscosity of 232,000 mm²/s expressed by the above-given formula (9) and 11 g of methyl trimethoxysilane were introduced into a 1,000 ml glass beaker followed by agitation with a homomixer for 5 minutes. Then, when 16 g of polyoxyethylene decyl ether (4 moles addition of ethylene oxide), 12 g of polyoxyethylene decyl ether (40 moles addition of ethylene oxide) and 21 g of water were added thereto followed by agitation with a homomixer, an increase was noted in the viscosity of the mixture. Further, 3 g of a 10% aqueous sodium carbonate solution were added to the mixture followed by kneading and agitation for 10 minutes with a dispermixer, and the mixture was diluted by adding 357 g of water to obtain a silicone aqueous emulsion (curable silicone aqueous emulsion A-18).

After 24 hours from preparation of this silicone aqueous emulsion, a few grams thereof were taken in a petri dish to obtain a solid by evaporation of water taking 24 hours at room temperature. This solid was found to be free of tackiness by finger touch and exhibited elastic resilience.

Component (B)

Aqueous emulsion of polyurethane resin B:
Superflex 600 (trade name by Daiichi Kogyo Seiyaku Co. polyether-type polyurethane, content of non-volatile matter: 25% by weight)

Component (C)

Organic Resin Powder C-1:
Acrylurethane Fine Powder BC-79 (trade name by Gifu Shellac Co., configuration: spherical, average particle diameter: 8 µm, melting point: not shown Organic Resin Fine Powder C-2:
nylon fine powder SP-500 (trade name by Toray Co., configuration: spherical, average particle diameter: 5 µm, melting point: 165° C.

Organic Resin Fine Powder C-3:
Crosslinked acrylic fine particles Art Pearl J-7P (trade name by Negami Kogyo Co., configuration: spherical, average particle diameter: 6 µm, melting point: not shown Organic Resin Fine Particles C-4:
Crosslinked urethene fine particles Daimic Beads UCN-5070D (trade name by Dainichi Seika Kogyo Co., configuration: spherical, average particle diameter: 7 µm, melting point: not shown)

Examples 1 to 25

The components (A), (B) and (C) characterized in the above-described preparation examples were blended in the blending amounts (in grams) shown in Table 1 and they were uniformly mixed together with an anchor-blade stirrer to prepare a coating composition for rubber in the form of an aqueous resin composition in which the components (A), (B) and (C) (effective components in the tables) were present with the blending ratio (values are shown in parts by weight in the tables) shown in Table 1.

Each of these coating compositions was then applied onto the surface of an EPDM rubber sheet (2 mm) with a brush to form a coating layer which was converted to a surface film by keeping for 5 minutes in a hot-air circulation thermostat set at 150° C. Evaluations thereof were made by measuring the surface lubricity, adhesion and wear resistance accordance to the above-described testing procedures 1 to 3. The results are shown in Table 1.

TABLE 1

| Example No. | Component(g) | | | (A):(B):(C) wt. ratio (effective amounts) | Properties | | |
|---|---|---|---|---|---|---|---|
| | (A) | (B) | (C) | | kinetic friction coeff. | adhesion (finger tip rubbing) | wear resistance (times rubbing) |
| 1 | A1 46.7 | B 42.7 | C1 10.6 | 100:40:40 | 0.2 | not peeled | 650 |
| 2 | A2 47.6 | B 41.9 | C1 10.5 | 100:40:40 | 0.2 | not peeled | 500 |
| 3 | A3 46.7 | B 42.7 | C1 10.6 | 100:40:40 | 0.3 | not peeled | 250 |
| 4 | A4 47.6 | B 41.9 | C1 10.5 | 100:40:40 | 0.2 | not peeled | 150 |
| 5 | A4 58.3 | B 32.1 | C1 9.6 | 100:25:30 | 0.2 | not peeled | 150 |
| 6 | A4 41.1 | B 49.8 | C1 9.1 | 100:55:40 | 0.2 | not peeled | 250 |
| 7 | A4 49.6 | B 43.6 | C1 6.8 | 100:40:25 | 0.2 | not Peeled | 250 |
| 8 | A4 50.3 | B 27.6 | C1 22.1 | 100:25:80 | 0.2 | not peeled | 150 |
| 9 | A5 54.6 | B 36.3 | C1 9.1 | 100:40:40 | 0.4 | not peeled | 150 |
| 10 | A6 64.9 | B 27.0 | C1 8.1 | 100:25:30 | 0.3 | not peeled | 150 |
| 11 | A7 64.9 | B 27.0 | C1 8.1 | 100:25:30 | 0.3 | not peeled | 200 |

TABLE 1-continued

| | Component(g) | | | (A):(B):(C) wt. ratio (effective amounts) | Properties | | |
|---|---|---|---|---|---|---|---|
| Example No. | (A) | (B) | (C) | | kinetic friction coeff. | adhesion (finger tip rubbing) | wear resistance (times rubbing) |
| 12 | A8 64.9 | B 27.0 | C1 8.1 | 100:25:30 | 0.2 | not peeled | 150 |
| 13 | A9 64.9 | B 27.0 | C1 8.1 | 100:25:30 | 0.2 | not peeled | 150 |
| 14 | A10 64.9 | B 27.0 | C1 8.1 | 100:25:30 | 0.2 | not peeled | 300 |
| 15 | A11 64.9 | B 27.0 | C1 8.1 | 100:25:30 | 0.2 | not peeled | 300 |
| 16 | A12 64.9 | B 27.0 | C1 8.1 | 100:25:30 | 0.2 | not peeled | 300 |
| 17 | A13 64.9 | B 27.0 | C1 8.1 | 100:25:30 | 0.2 | not peeled | 250 |
| 18 | A14 64.9 | B 27.0 | C1 8.1 | 100:25:30 | 0.2 | not peeled | 250 |
| 19 | A15 64.9 | B 27.0 | C1 8.1 | 100:25:30 | 0.2 | not peeled | 300 |
| 20 | A16 64.9 | B 27.0 | C1 8.1 | 100:25:30 | 0.2 | not peeled | 350 |
| 21 | A17 64.9 | B 27.0 | C1 8.1 | 100:25:30 | 0.2 | not peeled | 350 |
| 22 | A18 64.9 | B 27.0 | C1 8.1 | 100:25:30 | 0.2 | not peeled | 300 |
| 23 | A8 64.9 | B 27.0 | C1 8.1 | 100:25:30 | 0.2 | not peeled | 250 |
| 24 | A8 64.9 | B 27.0 | C1 8.1 | 100:25:30 | 0.2 | not peeled | 200 |
| 25 | A8 64.9 | B 27.0 | C1 8.1 | 100:25:30 | 0.2 | not peeled | 300 |

Comparative Examples 1 to 6

Aqueous resin compositions as a coating composition for rubber were prepared each in the same manner as Examples 1 to 25 with the components (A), (B) and (C) characterized above excepting the use of two additional components A-19 and A-20 obtained by the Preparation Examples 19 and 20 described below respectively, as variations of the component (A).

Table 2 below summarizes the compounding proportion of the components (A), (B) and (C) and the resuts of the evaluation tests in each of these Comparative Examples.

Preparation Example 19

350 g of an organopolysiloxane having a viscosity of 62 mm$^2$/s expressed by the formula (10) below and 50 g of vinyl trimethoxysilane were introduced into a 1,000 ml glass beaker followed by agitation with a homomixer for 5 minutes. Next, 20 g of polyoxyethylene decyl ether (4 moles addition of ethylene oxide), 15 g of polyoxyethylene decyl ether (40 moles addition of ethylene oxide), 3 g of a 10% aqueous potassium carbonate solution and 262 g of water were added thereto followed by agitation for 15 minutes with a homomixer and passing twice through a high-pressure homog-

TABLE 2

| | Component(g) | | | (A):(B):(C) wt. ratio (effective amounts) | Properties | | |
|---|---|---|---|---|---|---|---|
| Comparative No. | (A) | (B) | (C) | | kinetic friction coeff. | adhesion (finger tip rubbing) | wear resistance (times rubbing) |
| 1 | A19 46.7 | B 42.7 | C1 10.6 | 100:40:40 | 0.7 | peeled | — |
| 2 | A20 54.3 | B 36.6 | C1 9.1 | 100:40:40 | 0.7 | peeled | — |
| 3 | A1 87.5 | — | C1 12.5 | 100:0:25 | 0.4 | peeled | — |
| 4 | A1 25.9 | B 65.2 | C1 8.9 | 100:110:60 | 0.7 | not peeled | 50 |
| 5 | A1 52.3 | B 47.7 | — | 100:40:0 | 0.5 | not peeled | 100 |
| 6 | A1 35.4 | B 32.3 | C1 32.3 | 100:40:160 | 0.2 | not peeled | 50 | enizer set to a pressure of 30 MPa to obtain a silicone emulsion. This emulsion was then diluted by adding 359 g of water thereto to obtain a silicone aqueous emulsion (curable silicone aqueous emulsion A-19).

After 24 hours from preparation of this silicone aqueous emulsion, a few grams thereof were taken in a petri dish and kept standing for 24 hours at room temperature to evaporate water not to give a solid, the composition freed from water remaining liquid.

$$CH_3O-\underset{\underset{CH_3}{|}}{\overset{\overset{CH_3}{|}}{Si}}O-\left(\underset{\underset{CH_3}{|}}{\overset{\overset{CH_3}{|}}{Si}}O\right)_{40}-\underset{\underset{CH_3}{|}}{\overset{\overset{CH_3}{|}}{Si}}-OCH_3 \quad (10)$$

Preparation Example 20

280 g of an organopolysiloxane having a viscosity of 750 mm²/s exptrdded by the formula (11) given below and 15 g of vinyl trimethoxysilane were introduced into a 1,000 ml glass beaker followed by agitation with a homomixer for 5 minutes. Next, 16 g of polyoxyethylene decyl ether (4 moles addition of ethylene oxide), 12 g of polyoxyethylene decyl ether (40 moles addition of ethylene oxide) and 371 g of water were added thereto followed by agitation for 15 minutes with a homomixer and passing twice through a high-pressure homogenizer set to a pressure of 100 MPa. Then, 6 g of a mineral spirit solution of zirconium 2-ethylhexanoate (zirconium content: 12% as metal) were added thereto followed by agitation for 1 hour with an anchor-blade stirrer to obtain a silicone aqueous emulsion (curable silicone aqueous emulsion A-20).

After 24 hours from preparation of this silicone aqueous emulsion, a few grams thereof were taken in a petri dish and kept standing for 24 hours at room temperature to evaporate water not to give a cured solid, the composition freed from water remaining liquid.

$$CH_3O-\underset{\underset{CH_3}{|}}{\overset{\overset{CH_3}{|}}{Si}}O-\left(\underset{\underset{CH_3}{|}}{\overset{\overset{CH_3}{|}}{Si}}O\right)_{198}-\left(\underset{\underset{CH_3}{|}}{\overset{\overset{R^{13}}{|}}{Si}}O\right)_{4}-\underset{\underset{CH_3}{|}}{\overset{\overset{CH_3}{|}}{Si}}-OCH_3 \quad (11)$$

(wherein $R^{13}$ is a —$C_3H_6NHC_2H_4NH_2$ group).

Evaluation of the Results

As is understood from the above-given results, the results were satisfactory in Examples 1 to 25 according to the present invention in each of of surface lubricity, adhesion and wear resistance.

In contrast, in the case of an organopolysiloxane in which the component (A-1) does not have a group represented by the formula (1) as in Comparative Example 1, the curability of the component (A) is inadequate and, as a result, the surface lubricity and adhesion of the resulting coating film are inadequate.

In addition, in the case of an organopolysiloxane in which the component (A-1) contains a group represented by the formula (1) in the side chains thereof instead of the molecular chain terminals as in Comparative Example 2, the curability of the component (A) is inadequate and, as a result, the surface lubricity and adhesion of the resulting coating film are inadequate.

In addition, in the case without compounding of a polyurethane resin as the component (B) as in Comparative Example 3, the adhesion of the resulting coating film is inadequate.

In addition, in the case of adding a large amount of a polyurethane resin as the component (B) as in Comparative Example 4, the surface lubricity and adhesion of the resulting coating film would be inadequate.

In addition, in the case without compounding of organic resin fine particles as the component (C) as in Comparative Example 5, the surface lubricity and wear resistance of the resulting coating film are inadequate.

In addition, in the case of compounding with a too large amount of the organic resin fine particles as the component (C) as in Comparative Example 6, the wear resistance of the resulting coating film is inadequate.

What is claimed is:

1. A coating composition for rubber articles which comprises:
   A) 100 parts by weight of a component (A) which is a curable silicone composition consisting of subcomponents (A-1), (A-2) and (A-3):
   wherein (A-1) is an organopolysiloxane having:
   a hydroxyl group or a group of the formula $R^1O—$, wherein $R^1$ is a monovalent hydrocarbon group having 1 to 6 carbon atoms, and
   a group represented by the formula $$—R^2(N—R^3)_mN—R^5$$
   $$\phantom{—R^2(N}|\phantom{—R^3)_mN}|$$
   $$\phantom{—R^2(N}R^4\phantom{—R^3)_mN}R^6$$

in which m is 0 or a positive integer not exceeding 6,
   $R^2$ is an optionally substituted divalent hydrocarbon group having 1 to 6 carbon atoms,
   $R^3$ is a divalent hydrocarbon group having 1 to 4 carbon atoms,
   $R^4$, $R^5$ and $R^6$ are each a hydrogen atom or an optionally substituted monovalent hydrocarbon group having 1 to 10 carbon atoms with the proviso that, when m is not 0, at least one of $R^4$, $R^5$ and $R^6$ is a hydrogen atom and,
   when m is 0, at least one of $R^5$ and $R^6$ is a hydrogen atom, as bonded to each of at least two terminal silicon atoms of the polysiloxane chain,
   (A-2) is an alkoxysilane compound represented by the general formula

$$R^7{}_aSi(OR^8)_{4-a}$$

in which a is 0 or 1,
   $R^7$ is an optionally substituted monovalent hydrocarbon group having 1 to 20 carbon atoms and
   $R^8$ is, each independently from the others, a monovalent hydrocarbon group having 1 to 6 carbon atoms, and
   (A-3) is a condensation catalyst in an amount of 0 to 10 parts by weight per 100 parts by weight of the total amount of the subcomponents (A-1) and (A-2);
   B) a component (B) which is a polyurethane resin in an amount of 10 to 100 parts by weight; and
   C) a component (C) which is a fine powder of an average particle diameter of 0.5 to 50 μm made from an organic resin having a melting point of 150° C. or higher or having no melting point in an amount of 5 to 150 parts by weight.

2. A coating composition for rubber articles according to claim 1 wherein the amount of the subcomponent (A-2) relative to the subcomponent (A-1) is sufficient to give 0.5 to 100 moles of the groups denoted by $R^8O$— therein per mole of the total amount of the hydroxyl groups and the groups denoted by $R^1O$— in the subcomponent (A-1).

3. A coating composition for rubber articles according to claim 1 wherein the organopolysiloxane as the subcomponent (A-1) is an organopolysiloxane represented by the general formula in which each $R^9$ is, independently from the others, a hydrogen atom or a monovalent hydrocarbon group having 1 to 6 carbon atoms, each $R^{10}$ is, independently from the others, a monovalent hydrocarbon group having 1 to 20 carbon atoms, each $R^{11}$ is a group represented by the general formula each symbol therein having the same meaning as defined in claim 1, each $R^{12}$ is, independently from the others, a monovalent hydrocarbon group having 1 to 20 carbon atoms and n is an average number of 10 to 2000.

4. A coating composition for rubber articles according to claim 1 wherein the alkoxysilane compound as the subcomponent (A-2) is selected from the group consisting of methyl trimethoxy silane, phenyl trimethoxy silane, vinyl trimethoxy silane, vinyl triethoxy silane, γ-acryloyloxypropyl trimethoxy silane, γ-methacryloyloxypropyl trimethoxy silane, 3,3,3-trifluoropropyl trimethoxy silane, tetramethoxy silane, methyl triethoxy silane, phenyl triethoxy silane, γ-acryloyloxypropyl triethoxy silane, γ-methacryloyloxypropyl triethoxy silane, 3,3,3-trifluoropropyl triethoxy silane, tetramethoxy silane and tetraethoxy silane.

5. A coating composition for rubber articles according to claim 1 wherein the condensation catalyst as the subcomponent (A-3) is a metal compound selected from the group consisting of sodium compounds, aluminum compounds, potassium compounds, calcium compounds, vanadium compounds, iron compounds, cobalt compounds, nickel compounds, zirconium compounds, barium compounds and zinc compounds.

6. A coating composition for rubber articles according to claim 1 wherein the fine powder of an organic resin has a spherical particle configuration and the organic resin is selected from the group consisting of polyamide resins, crosslinked acrylic resins, crosslinked polyurethane resins and acrylic urethane resins.

7. A rubber article having a coating layer formed by coating with the coating composition according to claim 1.

* * * * *

UNITED STATES PATENT AND TRADEMARK OFFICE
CERTIFICATE OF CORRECTION

PATENT NO. : 7,652,091 B2 Page 1 of 1
APPLICATION NO. : 11/396463
DATED : January 26, 2010
INVENTOR(S) : Yoshinori Inokuchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 943 days.

Signed and Sealed this

Twenty-third Day of November, 2010

David J. Kappos
*Director of the United States Patent and Trademark Office*